US011267739B2

(12) United States Patent
Steele

(10) Patent No.: US 11,267,739 B2
(45) Date of Patent: Mar. 8, 2022

(54) EMERGENCY WATER FILTRATION KIOSK AND METHOD OF USE

(71) Applicant: Planet Water, LLC, Scottsdale, AZ (US)

(72) Inventor: Mark A. Steele, Phoenix, AZ (US)

(73) Assignee: Planet Water, LLC, Phoenix, AZ (US)

( * ) Notice: Subject to any disclaimer, the term of this patent is extended or adjusted under 35 U.S.C. 154(b) by 97 days.

(21) Appl. No.: 16/560,708

(22) Filed: Sep. 4, 2019

(65) Prior Publication Data

US 2021/0061693 A1   Mar. 4, 2021

(51) Int. Cl.
| | |
|---|---|
| *B01D 15/10* | (2006.01) |
| *B01D 61/14* | (2006.01) |
| *B01D 61/18* | (2006.01) |
| *C02F 1/00* | (2006.01) |
| *C02F 1/44* | (2006.01) |
| *C02F 9/00* | (2006.01) |
| *G09B 19/00* | (2006.01) |

(Continued)

(52) U.S. Cl.
CPC ............... *C02F 9/00* (2013.01); *B01D 15/10* (2013.01); *B01D 61/145* (2013.01); *B01D 61/18* (2013.01); *G09B 19/0076* (2013.01); *B01D 2311/04* (2013.01); *B01D 2311/06* (2013.01); *B01D 2311/12* (2013.01); *B01D 2311/2626* (2013.01); *B01D 2311/2649* (2013.01); *B01D 2311/2692* (2013.01); *C02F 1/001* (2013.01); *C02F 1/283* (2013.01); *C02F 1/444* (2013.01); *C02F 1/76* (2013.01); *C02F 2201/002* (2013.01); *C02F 2201/008* (2013.01); *C02F 2303/04* (2013.01)

(58) Field of Classification Search
CPC .......... B01D 61/145; C02F 1/444; C02F 9/00; C02F 2201/008; C02F 2303/04
See application file for complete search history.

(56) References Cited

U.S. PATENT DOCUMENTS 4,151,092 A * 4/1979 Grimm .................. C02F 1/003
                                                           210/256
6,936,176 B1 * 8/2005 Greene, III ............ C02F 9/005
                                                           210/205

(Continued)

*Primary Examiner* — Bradley R Spies
(74) *Attorney, Agent, or Firm* — Luke C. Holst; McGrath North Mullin & Kratz, PC LLO

(57) ABSTRACT

The present invention relates in general to the field of water kiosks, and more specifically, to an emergency water filtration kiosk and method of delivering clean and safe water using the emergency water filtration kiosk. One aspect of the emergency water filtration kiosk and method of use may include a four-stage water filtration system to better purify, clean, and improve the taste of water. The emergency water filtration kiosk and method of use may further include a turn-key variable pump system that is configured to supply water to the emergency water filtration kiosk via three alternative power sources. The purpose of the invention is to provide a self-contained and rapidly deployable emergency response water filtration kiosk and method of use that delivers clean and safe drinking water to people in need after a natural disaster. An additional purpose of the invention is to provide an emergency water filtration kiosk and method of use that offers a wide variety of on-board integrated pumping solutions to supply water to the filtration kiosk under any power condition.

18 Claims, 5 Drawing Sheets

(51) Int. Cl.
*C02F 1/28* (2006.01)
*C02F 1/76* (2006.01)

(56) References Cited

U.S. PATENT DOCUMENTS

| | | | | |
|---|---|---|---|---|
| 8,808,537 | B1* | 8/2014 | Livingston | C02F 9/005 |
| | | | | 210/196 |
| 10,696,575 | B1* | 6/2020 | Pyle | C02F 9/00 |
| 2007/0199875 | A1* | 8/2007 | Moorey | B01D 61/18 |
| | | | | 210/206 |
| 2009/0289011 | A1* | 11/2009 | Avakian | F24D 17/0073 |
| | | | | 210/668 |
| 2011/0215039 | A1* | 9/2011 | Acernese | C02F 9/00 |
| | | | | 210/172.4 |
| 2016/0018144 | A1* | 1/2016 | Cowley | F24D 19/00 |
| | | | | 62/85 |
| 2018/0238066 | A1* | 8/2018 | Blanchard | E04H 4/1281 |

* cited by examiner

EMERGENCY WATER FILTRATION KIOSK AND METHOD OF USE

FIELD OF THE INVENTION

The present invention relates in general to the field of water kiosks, and more specifically, to an emergency water filtration kiosk and method of use. The purpose of the invention is to provide a self-contained and rapidly deployable emergency response water filtration kiosk and method of use that delivers clean and safe drinking water to people in need. Thus, clean water may be conveniently delivered in emergency situations or after natural disasters to areas that lack the basic resources necessary to provide safe drinking water when municipal infrastructures fail.

BACKGROUND OF THE INVENTION

According to the Office of U.S. Foreign Disaster Assistance, the total natural disasters reported each year around the world has been steadily increasing in recent decades. The United States alone experienced fourteen natural disasters in 2018 that cost the economy at least $91 billion dollars. Kat Eschner, *The Most Dangerous Places To Live In America That Are Prone To Natural Disasters*, CNBC, Jul. 15, 2019 (update), available at https://www.cnbc.com/2019/07/10/billion-dollar-natural-disasters-rising-these-states-better-prepare.html. From category 5 hurricanes in Florida, to vast flooding in Nebraska, intense wildfires in California, and volcano eruptions in Hawaii, natural disasters can impact every state in the nation.

Natural disasters, including tsunamis, earthquakes, tornadoes, volcanoes, winter weather, floods and hurricanes, often strike quickly and are devastating to basic municipal infrastructure. Water treatment facilities are particularly vulnerable. For example, water treatment plants may become inoperative during a power outage, overwhelmed with excess precipitation, or blocked with debris and wreckage to operate effectively. Livestock manure, raw human sewage, unhealthy doses of chemicals and minerals from agriculture run-off, trash, wreckage, and other contaminates may pollute existing water supplies during a natural disaster. Indeed, the longest-term impact of recovery from a natural disaster is water management.

During and for months after a natural disaster, especially flooding, water may not be safe to consume or even come into contact with humans, such as for use in cooking, washing, or brushing one's teeth. Populations of developing countries and rural areas are most affected by a lack of safe, available water after a natural disaster, as assistance often takes longer to arrive in such impacted areas. A lack of basic infrastructure, the erosion of government services, and the scarcity of electricity in developing countries further complicate matters for providing clean and safe drinking water to an affected populace after a natural disaster.

Thus, a desire remains to provide a self-contained, rapidly deployable, and easily transportable emergency response water filtration kiosk and method of use that delivers clean, safe drinking water to people in need. A desire also remains to provide a water filtration kiosk that offers a wide variety of on-board integrated pumping solutions that may supply water to the filtration kiosk under any power condition.

BRIEF SUMMARY OF THE INVENTION

Therefore, it is a principal object, feature, and/or advantage of the present disclosure to overcome the aforementioned deficiencies in the art and provide an emergency water filtration kiosk and method of use that may deliver clean and safe drinking water to people in need.

Another object, feature, and/or advantage of the present disclosure is to provide an emergency water filtration kiosk and method of use that is self-contained and rapidly deployable during an emergency response.

Yet another object, feature, and/or advantage of the present disclosure is to provide an emergency water filtration kiosk and method of use that offers a turn-key variable pump system that is configured to supply water to the emergency water filtration kiosk via three alternative power sources (e.g., petrol, electricity, or manual).

An additional object, feature, and/or advantage of the present disclosure is to provide an emergency water filtration kiosk and method of use that utilizes a four-stage water filtration system to better purify, clean, and improve the taste of water.

A further object, feature, and/or advantage of the present disclosure is to provide an emergency water filtration kiosk and method of use that may be securely housed in a single lockable, vandal-resistant housing container.

A still further object, feature, and/or advantage of the present disclosure is to provide an emergency water filtration kiosk and method of use that is compact, light-weight, and compatibly sized to fit inside a standard shipping container, a semi-tractor trailer, and an aircraft cargo deck or hold.

Another object, feature, and/or advantage of the present disclosure is to provide an emergency water filtration kiosk and method of use that is rugged, reliable and able to endure harsh environmental conditions.

Yet another object, feature, and/or advantage of the present disclosure is to provide an emergency water filtration kiosk and method of use that maximizes efficiency, is easy to operate and convenient to transport.

An additional object, feature, and/or advantage of the present disclosure is to provide an emergency water filtration kiosk and method of use that is capable of supplying 1,500 liters of clean and safe drinking water every hour.

Yet another object, feature, and/or advantage of the present disclosure is to provide an emergency water filtration kiosk and method of use that is capable of supplying the daily drinking water requirements of up to 10,000 people daily (i.e., approximately 3.5 liters of water per person per day).

A further object, feature, and/or advantage of the present disclosure is to provide an emergency water filtration kiosk and method of use that is easy to clean and maintain.

A still further object, feature, and/or advantage of the present disclosure is to provide an emergency water filtration kiosk and method of use that is cost-efficient to manufacture, inexpensive to purchase, and affordable for developing countries.

Another object, feature, and/or advantage of the present disclosure is to provide an emergency water filtration kiosk and method of use that is environmentally-friendly and that reduces an unnecessary waste of water.

These and/or other objects, features, and/or advantages of the present disclosure will be apparent to those skilled in the art. The present disclosure is not to be limited to or by these objects, features, and advantages. No single aspect need provide each and every object, feature, or advantage.

According to one aspect of the present disclosure, an emergency water filtration kiosk is provided. The emergency water filtration kiosk may comprise a lockable, enclosed housing container. The enclosed housing container may further comprise a plurality of water access points configured to dispense water to a user. The emergency water filtration kiosk may include a turn-key variable pump system, a four-stage water filtration system and a water tank housed in compartments of the enclosed housing container. The turn-key variable pump system may be configured to pump water through the four-stage water filtration system using three alternative, on-board integrated pumping solutions that may supply water under any power condition available. The four-stage water filtration system may be configured to purify the water supplied by the turn-key variable pump system so that the water is clean and safe for drinking and usage. The clean and safe drinking water may be stored in the water tank. The water tank may further be connected to the plurality of water access points to dispense the clean and safe drinking water to users in need.

According to another aspect of the present disclosure, a method of delivering clean and safe water using the emergency water filtration kiosk is provided. The method may include providing a source of dirty water that is unsafe for human consumption, washing or cooking purposes. The method may next include providing the emergency water filtration kiosk and connecting it to the source of dirty water. The method may next comprise using the turn-key variable pump system to pump water through the four-stage water filtration system of the emergency water filtration kiosk. The method may also comprise purifying the water via the four-stage water filtration system and storing the clean and safe drinking water in the water tank. The clean and safe drinking water may then be dispensed at the plurality of water access points to users in need.

Different aspects may meet different objects of the disclosure. Other objectives and advantages of this disclosure will be more apparent in the following detailed description taken in conjunction with the figures. The present disclosure is not to be limited by or to these objects or aspects. It is to be understood that both the foregoing general description and the following detailed description are exemplary and explanatory only and are not necessarily restrictive of the present disclosure. The accompanying figures, which are incorporated in and constitute a part of the specification, illustrate subject matter of the disclosure. Together, the descriptions and the figures serve to explain the principles of the disclosure.

DESCRIPTION OF FIGURES

FIG. 1 is an isometric rear-right side view of the emergency water filtration kiosk of the present disclosure in a closed position.

FIG. 2 is an isometric front-left side view of the emergency water filtration kiosk of FIG. 1 in an open position.

FIG. 3 is a isometric close-up view of a turn-key variable pump system of the emergency water filtration kiosk of FIG. 2.

FIG. 4 is a isometric close-up view of a four-stage water filtration system of the emergency water filtration kiosk of FIG. 3.

FIG. 5 is a schematic view of the turn-key variable pump system and four-stage water filtration system of the emergency water filtration kiosk of FIGS. 3 and 4 shown apart from an enclosed housing container.

DETAILED DESCRIPTION OF THE INVENTION

Figure 1:
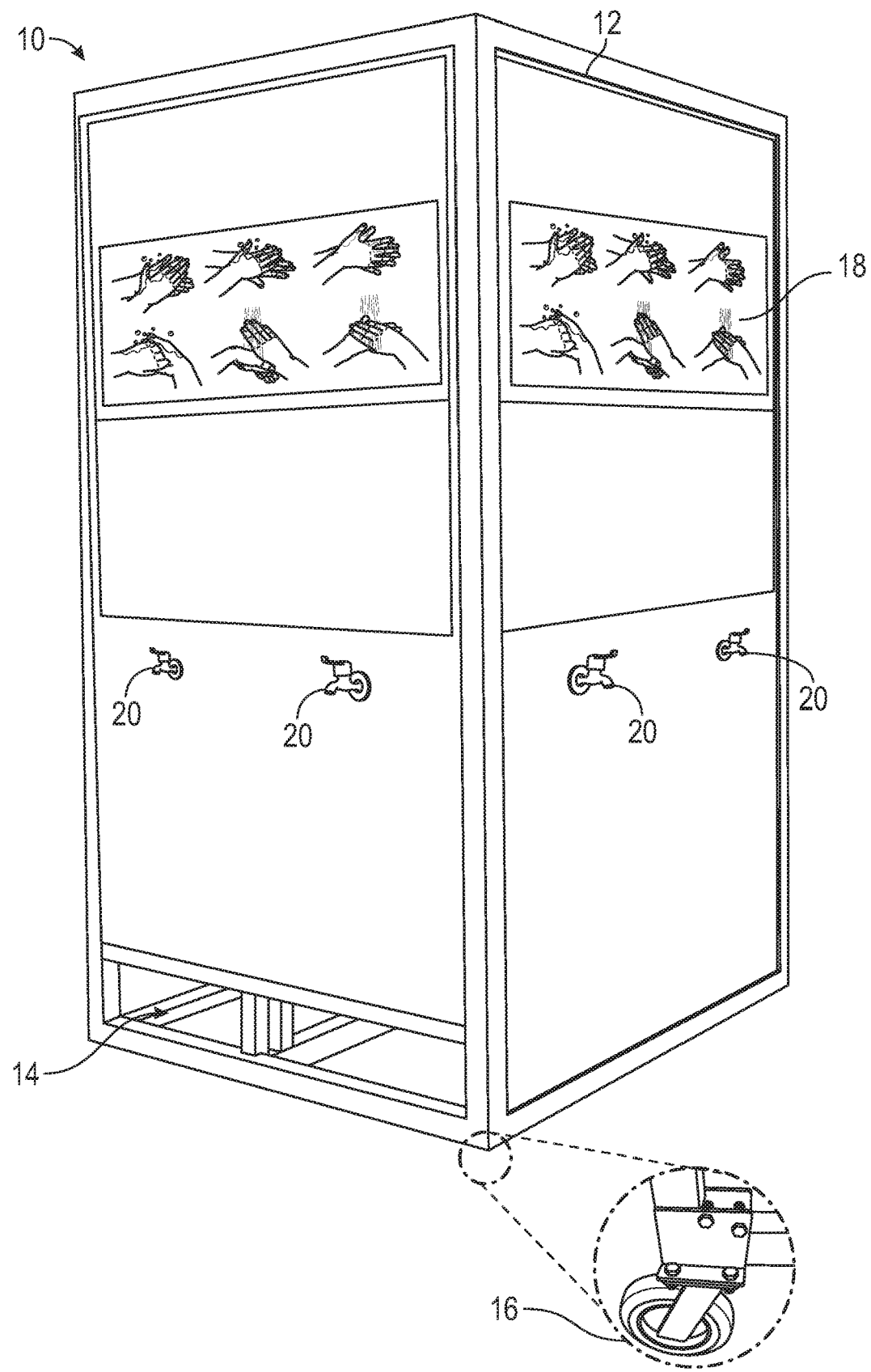
FIGS. 1-5 represent examples of an emergency water filtration kiosk of the present disclosure, and a method of delivering clean and safe water using the emergency water filtration kiosk.

FIG. 1 illustrates an isometric rear-right side view of one aspect of the emergency water filtration kiosk (10) of the present disclosure, wherein the emergency water filtration kiosk (10) is in a closed position. In particular, the emergency water filtration kiosk (10) may comprise a rectangular-shaped, enclosed housing container (12). It is contemplated that other shapes, such as square, circular, hexagonal, octagonal, pentagonal, etc. may also be utilized by the enclosed housing container (12) of the present disclosure. Dimensions of the enclosed housing container (12) may be approximately 128 cm in length×110 cm in width×210 cm in height. The dimensions of the enclosed housing container (12) are configured to be compatible in size with the following types of shipping options for rapid deployment of the emergency water filtration kiosk (10), including but not limited to: a standard 40 foot shipping container; an aircraft main cargo deck and lower cargo holds; and, a semi-tractor trailer. The enclosed housing container (12) may be comprised of light-weight, durable and rust-resistant materials such as aluminum plating. The enclosed housing container (12) is further configured to be lockable to prevent tampering/vandalism of interior components of the emergency water kiosk (10) while in the closed position.

Shown in FIG. 1, the enclosed housing container (12) may include at least two forklift access ports (14) located on opposite sides of the enclosed housing container (12). The forklift access ports (14) are configured to fit forks of a forklift to allow a forklift operator to conveniently pick-up, move and transport the water filtration kiosk (10) using the forklift. The enclosed housing container (12) may further comprise a series of detachable wheels (16) located towards the bottom of the enclosed housing container (12) to assist with on-site mobilization of the emergency water filtration kiosk (10). Additionally, the enclosed housing container (12) may include at least one hygiene education panel (18) located on at least one side of the emergency water filtration kiosk (10). Preferably, the hygiene education panel(s) are located on a front, rear, and opposing sides of the enclosed housing container (12). The hygiene education panel(s) (18) are configured to positively influence hygiene practices for users of the emergency water filtration kiosk (10) in their homes, among family members and in the wider community. The hygiene education panels (18) are also configured to be removable and replaceable on the housing container (12) so that a wide variety of hygiene educational panels (18) addressed to different hygienic conditions and practices may be utilized by the emergency water filtration kiosk (10) to further educate the public.

Further shown in FIG. 1, the enclosed housing container (12) may comprise a plurality of water access points (20) (e.g., water taps, faucets, spigots, nozzles, stopcocks or spouts). The plurality of water access points (20) may be located on at least one side of the emergency water filtration kiosk (10). Preferably the enclosed housing container (12) comprises a total of six water access points (20), with two water access points (20) on a first, second and third side of the enclosed housing container (12). It is contemplated that a higher or lower number of water access points (20) may also be utilized by the present disclosure. The water access points (20) are configured so that a user may manually turn on/off a flow of water at the water access point (20) to dispense water to the user.

Figure 2:
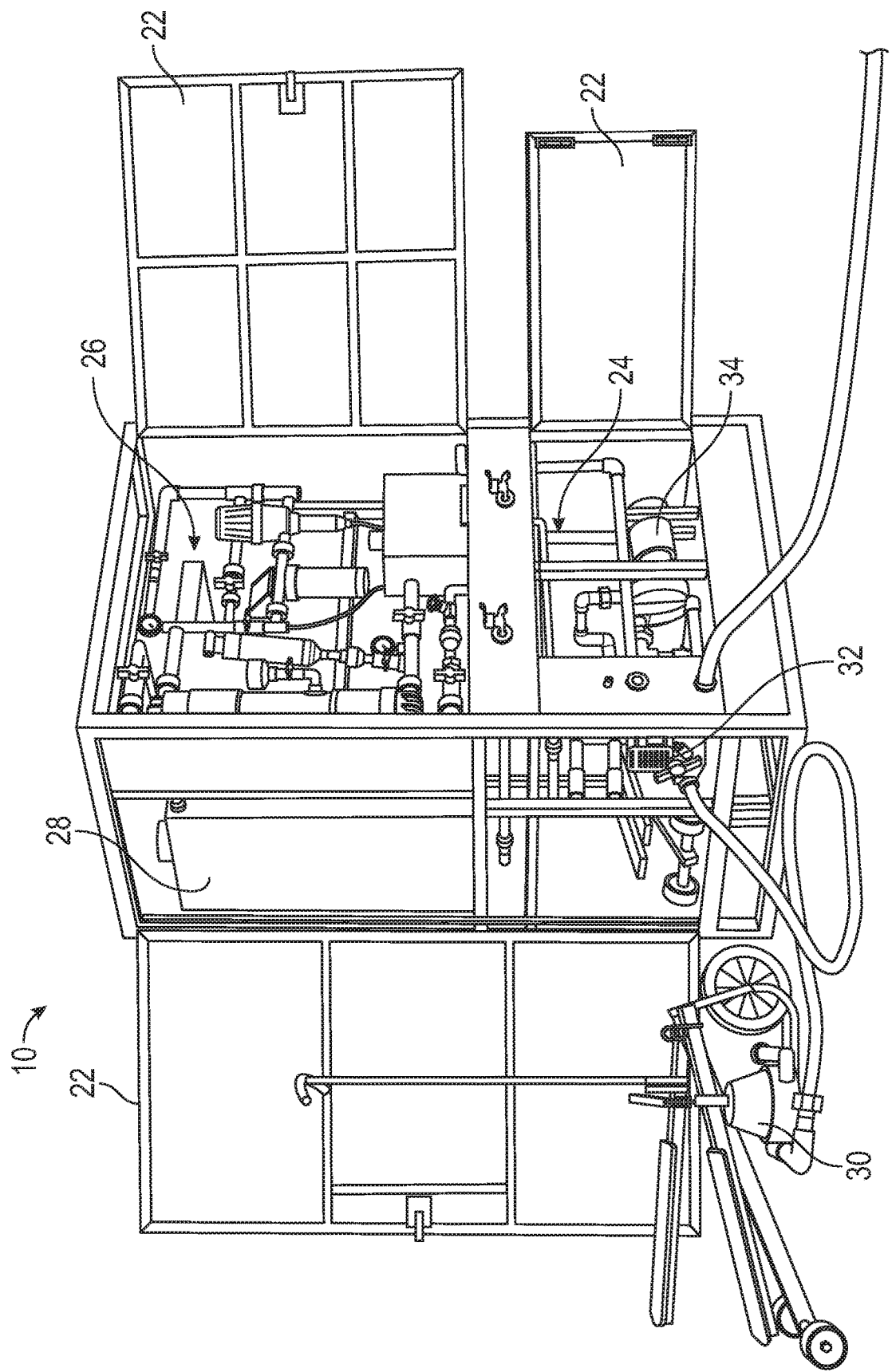

FIG. 2 illustrates an isometric front-left side view of the emergency water filtration kiosk (10) in an open position. In particular, the enclosed housing container (12) may comprise at least one door (22) with a lockable latch to provide convenient and secure access to interior components of the emergency water filtration kiosk (10) for maintenance and operation. The enclosed housing container (12) may further comprise at least four compartments. A first compartment may house a turn-key variable pump system (24). A second compartment may house a four-stage water filtration system (26). A third compartment may house a water tank (28). A fourth compartment may house a water supply hose (38). In particular, the turn-key variable pump system (24) may be configured to receive water through the water supply hose (38) and pump the water through the four-stage water filtration system (26). The four-stage water filtration system (26) may be configured to purify the water supplied by the turn-key variable pump system (24) so that the water is clean and safe for drinking and usage. The water tank (28) may be configured to store approximately 400-500 liters of water purified by the four-stage water filtration system (26). The water tank (28) may further be connected to the plurality of water access points (20) to dispense the clean and safe drinking water to users in need.

Figure 3:
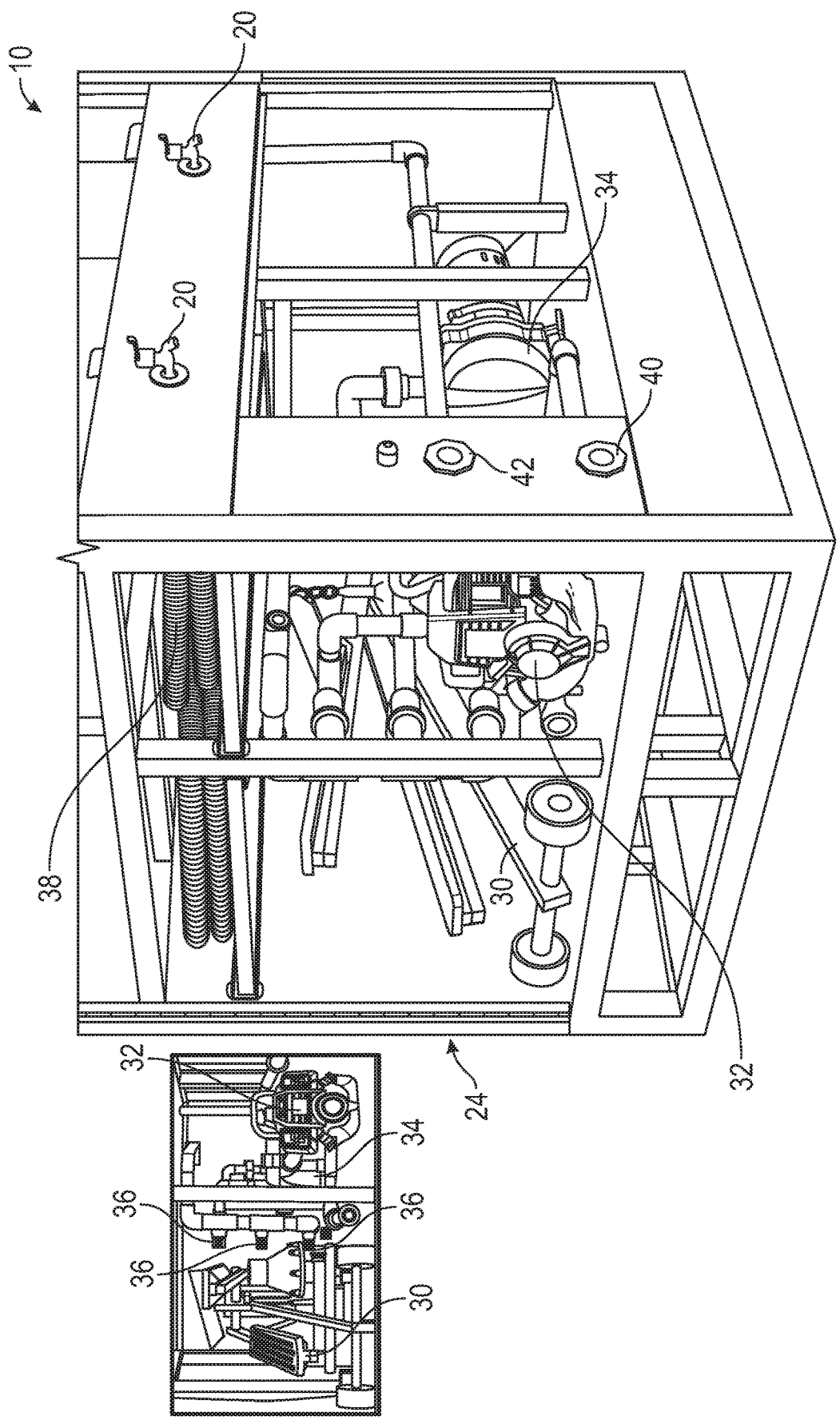

FIG. 3 illustrates an isometric close-up view of the turn-key variable pump system (24) of the emergency water filtration kiosk (10). In particular, the turn-key variable pump system (24) may comprise on-board integrated pumping solutions for pumping water through the four-stage water filtration system (26) of the emergency water filtration kiosk (10). These on-board integrated pumping solutions are configured to supply water under any power condition available to the emergency water filtration kiosk (10). In particular, the on-board integrated pumping solutions may comprise at least three alternative power sources for pumping water, including but not limited to: a manual pump (30) (e.g., stepper pump); a petrol pump (32); and, an electric pump (34) that may be compatible with a 110V -240 V/50-60 Hz outlet.

Shown in FIG. 3, the emergency water filtration kiosk (10) may further comprise a water source inlet (40). During operation, a first end of the water supply hose (38) may be placed into a source of dirty water that needs purified (e.g., lake, river, stream, well, or municipal source). A second end of the water supply hose (38) may be connected to the water source inlet (40), which is further connected to the turn-key variable pump system (24) by a series of pipes and manifolds. The connection between the water source inlet (40) and water supply hose (38) may comprise a camlock fitting, a screw-type fitting, an interlocking fitting, or any other fitting capable of removably connecting the water supply hose (38) to the turn-key variable pump system (24). The water supply hose (38) is configured to supply water from the source of dirty water to the emergency water filtration kiosk (10).

Further shown in FIG. 3, the turn-key variable pump system (24) may also comprise a series of turn-key valves (36) configured to allow the user to select and direct water received from the water supply hose (38) to either the manual pump (30), the petrol pump (32), or the electric pump (34) depending on the power conditions currently available to the emergency water filtration kiosk (10). The selection of either the manual pump (30), the petrol pump (32), or the electric pump (34) may be accomplished via the turning of a specific valve of the series of turn-key valves (36). For example, if petrol is available the corresponding turn-key valve (36) for the petrol pump (32) may be selected and utilized to direct the water to the petrol pump (32) for pumping through the four-stage water filtration system (26). Alternatively, if electricity is available the corresponding turn-key valve (36) for the electric pump (34) may be selected and utilized to direct the water to the electric pump (34) for pumping through the four-stage water filtration system (26). On the other hand, if neither petrol or electricity are available, the corresponding turn-key valve (36) for the manual pump (30) may be selected and utilized to direct the water to the manual pump (30) for pumping the water through the four-stage water filtration system (26). In this manner, the turn-key variable pump system (24) is configured to supply water to the emergency water filtration kiosk (10) under any power condition.

Figure 4:
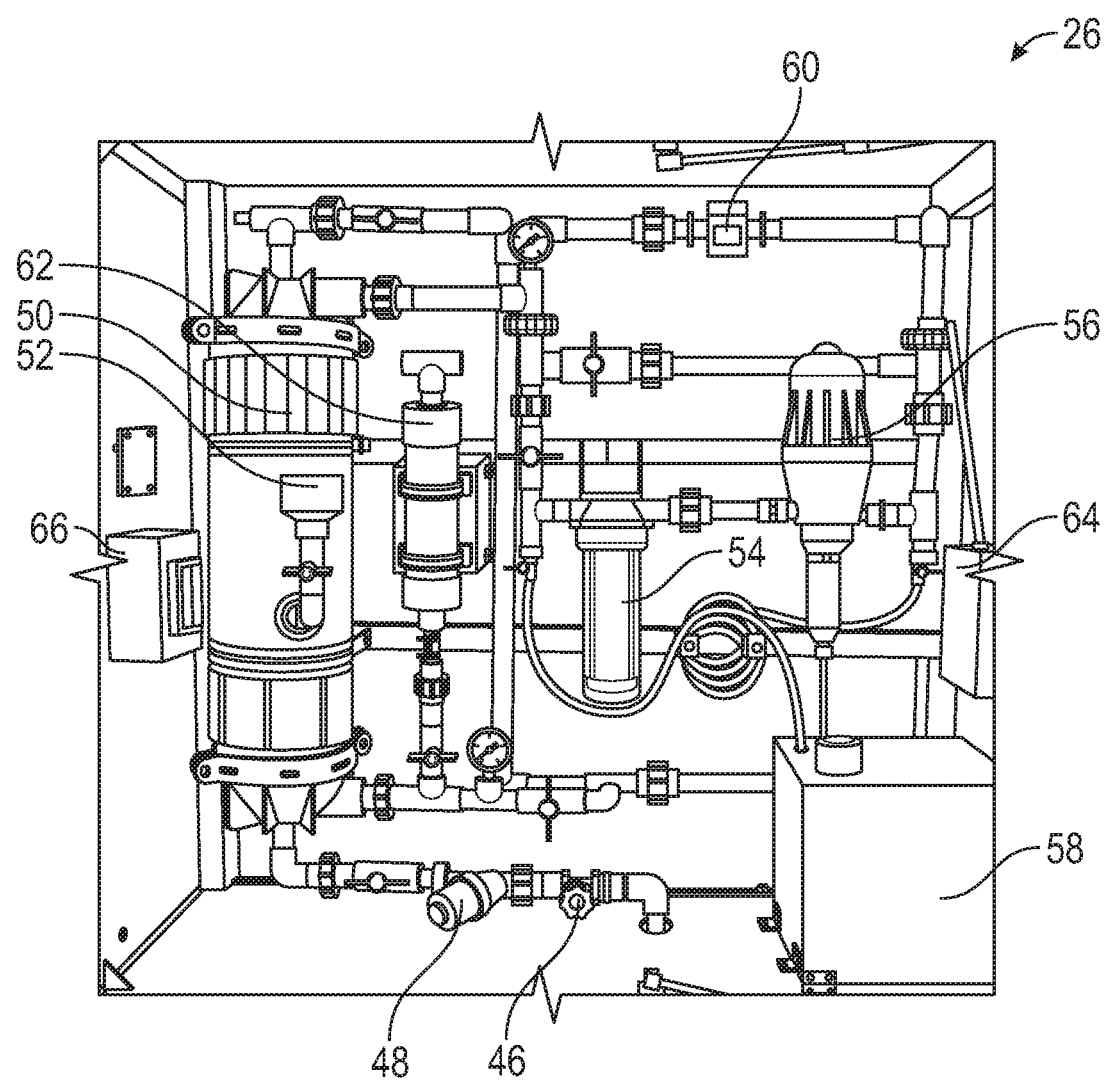

FIG. 4 illustrates an isometric close-up view of the four-stage water filtration system (26) of the emergency water filtration kiosk (10). The four-stage water filtration system (26) may be connected to the turn-key variable pump system (24) by at least one pipe and gate valve (46). The gate valve (46) may be configured to act as an on/off valve and further provide control over the amount of water entering the four-stage water filtration system (26) from the turn-key variable pump system (24).

Shown in FIG. 4, the four-stage water filtration system (26) may comprise a screen filter (48), connected to an ultrafiltration filter (50), connected to an activated carbon filter (54), and further connected to a chlorine dosing unit (56). The screen filter (48) may be configured to separate and remove both organic (e.g., algae, slime, floating debris) and inorganic particles (e.g., sand, grit, dirt) from the water. The ultrafiltration filter (50) may be configured to remove all colloidal particles (larger than 0.01 microns in size) from the water, including large dissolved contaminants. Similar to reverse osmosis, the ultrafiltration filter (50) may use hydrostatic pressure to force water through a semi-permeable membrane. Thus, clean and safe water passes through the semi-permeable membrane while suspended solids and solutes of high molecular weight are filtered out (e.g., suspended solids, bacteria, viruses, endotoxins and other pathogens) to produce water with a high purity and low silt density. The activated carbon filter (54) may be configured to remove contaminants, impurities, chlorine, sediments, volatile organic compounds, taste and odor from the water via chemical adsorption using activated carbon (e.g., fixed-bed carbon filters or solid carbon block filters). The chlorine dosing unit (56) may be configured to add chlorine to the water, known as chlorination, for disinfection purposes, to kill germs, and to keep the water safe for human consumption for up to approximately 24 hours after filtration. Particular types of chlorine that may be utilized by the chlorine dosing unit (56) include, but are not limited to, sodium hypochlorite and calcium hypochlorite. The chlorine dosing unit (56) may further comprise a refillable chlorine solution tank (58) of approximately 15-25 liters in volume for storing chlorine utilized in the four-stage water filtration system (26). The four-stage water filtration system (26) comprising the screen filter (48), ultrafiltration filter (50), activated carbon filter (54), and chlorine dosing unit (56) are configured to provide clean, tasteful and safe drinking water for up to 24 hours after filtration at an approximate microbial pathogen removal rate of >99.99%.

Further shown in FIG. 4, the ultrafiltration filter (50) may comprise an air pump (62) with valve for manual cleaning purposes. In particular, the air pump (62) may be configured to allow a user to inject air into the bottom of the ultrafiltration filter (50) by manually pumping the air pump (62). Air may then travel upwards through the ultrafiltration filter (50) to agitate and dislodge contaminants. These contaminants may be flushed out of the ultrafiltration filter (50) via a flush water outlet (42) located on the exterior of the emergency water filtration kiosk (10). The purging of contaminants from the ultrafiltration filter (50) using the air pump (62) may be accomplished by the following steps: (1) closing a clean water output valve on the ultrafiltration filter (50); (2) opening a flush outlet valve on the ultrafiltration filter (50); and, (3) manually pumping the air pump (62) approximately 10-25 times.

Still further shown in FIG. 4, the ultrafiltration filter (50) may comprise a chlorine cleaning input funnel (52) with valve for chemical cleaning purposes. In particular, the chlorine cleaning input funnel (52) may be configured to allow a user to inject a chlorine and/or bleach solution directly into the ultrafiltration filter (50) through a hole in a side wall of the ultrafiltration filter (50). The chemical cleaning of the ultrafiltration filter (50) using the chlorine cleaning input funnel (52) may be accomplished by the following steps: (1) closing the gate valve (46); (2) draining the ultrafiltration filter (50) of water; (3) opening the valve for the #chlorine cleaning input funnel (52); (4) inserting approximately 150-250 ml of chlorine and/or bleach into the chlorine cleaning input funnel (52); (5) inserting water into the chlorine cleaning input funnel (52) to create a chlorine and/or bleach solution inside the ultrafiltration filter (50); (6) allowing time for the ultrafiltration filter (50) to soak in the chlorine and/or bleach solution for approximately 5-10 minutes; (7) draining the chlorine and/or bleach solution from the ultrafiltration filter (50); and, (8) manually flushing the ultrafiltration filter (50) for approximately 5-15 minutes to remove any residual chlorine and/or bleach solution from ultrafiltration filter (50).

Yet further shown in FIG. 4, the four-stage water filtration system (26) may also comprise an electric flow meter (60) configured to measure the amount of water passing through the four-stage water filtration system (26) during a set time period. The compartment housing the four-stage water filtration system (26) may comprise a removable or fixed tool box (64). The tool box (64) may include tools and/or replacement parts that are compatible to aid in the maintenance and repair of various components of the emergency water filtration kiosk (10). The compartment housing the four-stage water filtration system (26) may also comprise an electric pump switch and fuse (66) for the electric pump (34) of the turn-key variable pump system (24).

Figure 5:
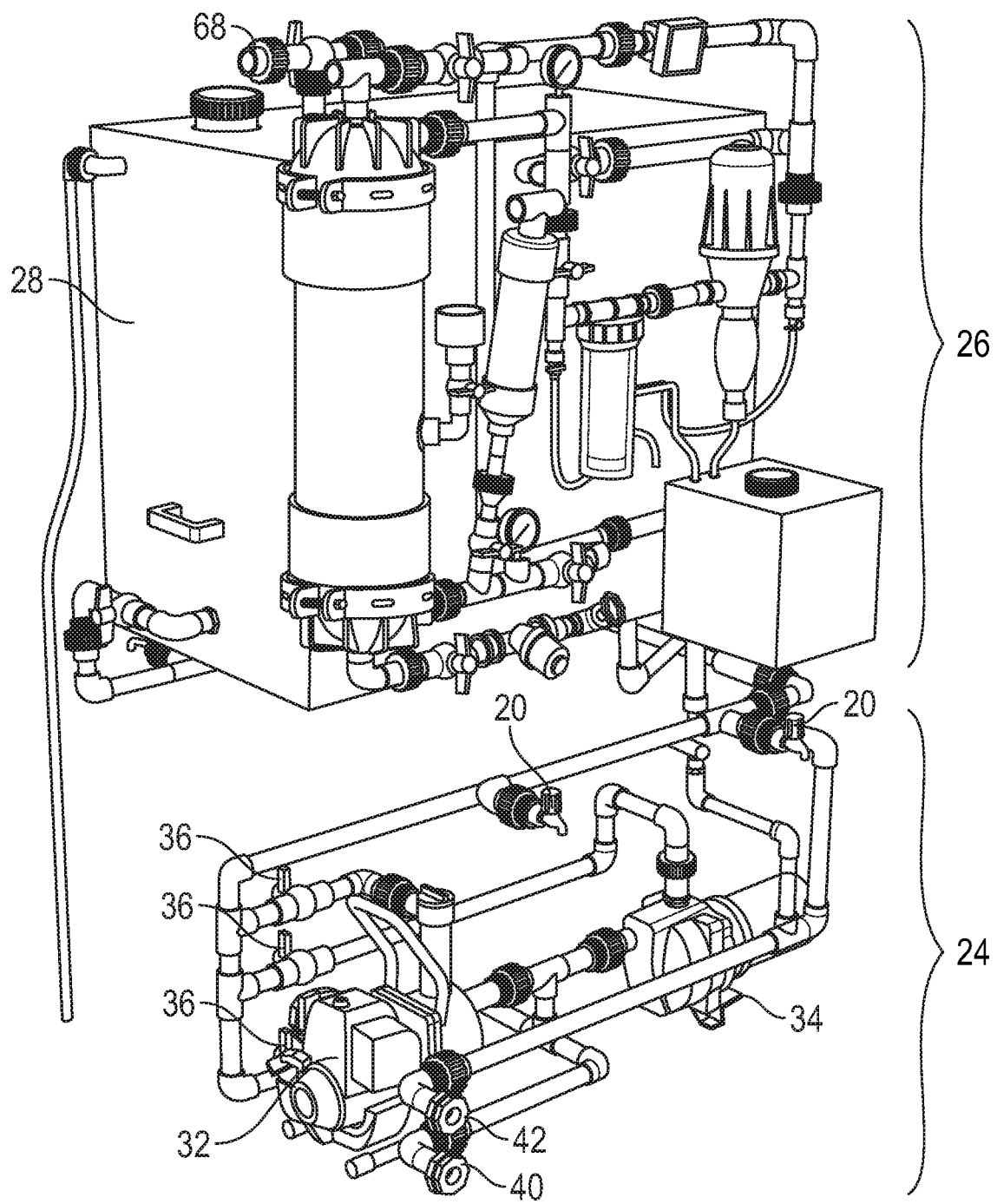

FIG. 5 illustrates a schematic view of the turn-key variable pump system (24) and four-stage water filtration system (26) of the emergency water filtration kiosk (10), shown apart from the enclosed housing container (12). Depending on power conditions available, a specific turn-key valve (36) of the series of turn-key valves (36) may be selected to direct water to its corresponding manual pump (30), petrol pump (32), or electric pump (34). After selecting the specific turn-key valve (36), its corresponding manual pump (30), petrol pump (32), or electric pump (34) may be activated to initiate the turn-key variable pump system (24) and pump water into the emergency water filtration kiosk (10). Dirty water from a lake, river, stream, well, or municipal source may enter the emergency water filtration kiosk (10) through the water supply hose (38) connected to the water source inlet (40).

Further shown in FIG. 5, the turn-key variable pump system (24) is configured to pump water received from the water supply hose (38), through the water source inlet (40), into the gate valve (46), and further through the four-stage water filtration system (26). Particularly with regard to the four-stage water filtration system (26), water may first enter the screen filter (48) to separate and remove both organic and inorganic particles. Second, water may enter the ultrafiltration filter (50) to remove all colloidal particles and large dissolved contaminants. Third, water may enter the activated carbon filter (54) to remove contaminants, impurities, chlorine, sediments, volatile organic compounds, taste and odor. Fourth, the chlorine dosing unit (56) may add chlorine to the water to disinfect and kill germs. At this stage, the water is now clean and safe for drinking, washing and cooking purposes.

Still further shown in FIG. 5, the clean and safe drinking water may next be directed into the water tank (28) for storage purposes. The clean and safe drinking water may flow as needed, via gravity, from the water tank (28) to the plurality of water access points (20) placed strategically around the exterior of the enclosed housing container (12) for convenient distribution to users in need. The emergency water filtration kiosk (10) may additionally comprise an external water output valve (68) connected to the four-stage water filtration system (26) and/or the water tank (28). The external water output valve (68) may be configured to quickly supply large quantities of clean and safe drinking water directly from the four-stage water filtration system (26) and/or the water tank (28) to an external water tank or water truck. Notably, the facilitation of a gravity feed from the water tank (28) to the plurality of water access points (20) and to the external water output valve (68) prevents the need for an additional pump and therefore aids in the conservation of energy.

Another aspect of the present disclosure is a method of delivering clean and safe drinking water using the emergency water filtration kiosk of FIGS. 1-5. In particular, the method may comprise providing a source of dirty water (e.g., lake, river, stream, well, or municipal source) that is unsafe for human consumption, washing or cooking purposes. The method may include providing the emergency water filtration kiosk of FIGS. 1-5. The method may next include placing the first end of the water supply hose (38) into the source of dirty water and connecting the second end of the water supply hose (38) to the water source inlet (40). The method may next comprise selecting a specific turn-key valve (36), depending on power conditions available, to direct water to its corresponding manual pump (30), petrol pump (32), or electric pump (34) of the turn-key variable pump system (24). After the specific turn-key valve (36) is selected, the method may next include activating its corresponding manual pump (30), petrol pump (32), or electric pump (34) to initiate the turn-key variable pump system (24) for pumping the water through the four-stage water filtration system (26).

The method may next comprise opening the gate valve (46) to allow water to enter the emergency water filtration kiosk (10) through the water source inlet (40) and connected water supply hose (38). The method may further comprise pumping the water through the four-stage water filtration system (26) via the activated turn-key variable pump system (24). As the water is pumped through the four-stage water filtration system (26), the water may be purified by the screen filter (48), the ultrafiltration filter (50), the activated carbon filter (54), and the chlorine dosing unit (56). The water is now clean and safe for drinking, washing and cooking purposes. The method may next comprise storing the clean and safe drinking water in the water tank (28). The clean and safe drinking water may then be dispensed at the plurality of water access points (20) and/or via the external water output valve (68) to deliver clean and safe drinking water to users in need. Optionally, the method may comprise manually and/or chemically cleaning the ultrafiltration filter (50) using the air pump (62) and chlorine cleaning input funnel (52).

The emergency water filtration kiosk (10) of the present disclosure and method of use are universally applicable for natural disasters or emergency situations in any nation or location that might require clean and safe drinking water. Furthermore, while intended for emergency response, the emergency water filtration kiosk (10) and method may be used in any situation where there is simply a need for convenient, clean and safe drinking water. Although the disclosure has been described and illustrated with respect to preferred aspects thereof, it is not to be so limited since changes and modifications may be made therein which are within the full intended scope of the disclosure.

What is claimed is:

1. An emergency water filtration kiosk for providing clean and safe drinking water, comprising:
   an enclosed housing container, the enclosed housing container comprising:
   a) at least two forklift access ports located on opposite sides of the enclosed housing container;
   b) a series of detachable wheels located towards a bottom of the enclosed housing container;
   c) at least one hygiene education panel located on at least one side of the enclosed housing container;
   d) a plurality of water access points located on at least one side of the enclosed housing container;
   e) at least one door having a lockable latch configured to provide access to interior components of the emergency water filtration kiosk;
   f) a plurality of compartments;
   g) the enclosed housing container configured to fit inside a standard shipping container, a semi-tractor trailer, or an aircraft cargo deck/hold;
   a turn-key variable pump system housed in a first compartment of the enclosed housing container;
   the turn-key variable pump system comprising a series of turn-key valves and at least three alternative power sources for pumping water;
   the at least three alternative power sources for pumping water comprising:
   a) a manual pump;
   b) a petrol pump; and
   c) an electric pump;
   a four-stage water filtration system housed in a second compartment of the enclosed housing container, the four-stage water filtration system comprising:
   a) a screen filter;
   b) an ultrafiltration filter;
   c) an activated carbon filter;
   d) a chlorine dosing unit comprising a designated refillable chlorine solution tank;
   the ultrafiltration filter comprising:
   a) a semi-permeable membrane configured to remove colloidal particles from water;
   b) a chlorine cleaning input funnel configured to permit chemical solution to be injected into the ultrafiltration filter for cleaning purposes; and
   c) an air pump configured for cleaning the ultrafiltration filter;
   a water tank housed in a third compartment of the enclosed housing container, the water tank connected to the plurality of water access points;
   a water supply hose housed in a fourth compartment of the enclosed housing container, the water supply hose removable from the fourth compartment and configured to supply dirty water to the emergency water filtration kiosk;
   the series of turn-key valves configured to select and direct dirty water received from the water supply hose to either the manual pump, the petrol pump, or the electric pump depending on power conditions currently available to the emergency water filtration kiosk;
   the turn-key variable pump system configured to receive dirty water from the water supply hose and pump the dirty water through the four-stage water filtration system;
   the four-stage water filtration system configured to purify the dirty water to provide clean and safe drinking water;
   the water tank configured to store the clean and safe drinking water; and
   the plurality of water access points configured to dispense the clean and safe drinking water from the water tank to persons in need of the clean and safe drinking water.

2. The emergency water filtration kiosk of claim 1, wherein the manual pump is stored inside the first compartment of the enclosed housing container and removable during operation.

3. The emergency water filtration kiosk of claim 1, further comprising:
   an external water output valve connected to the four-stage water filtration system and/or the water tank; and
   the external water output valve configured to quickly supply large quantities of clean and safe drinking water directly from the four-stage water filtration system and/or the water tank to persons in need of the clean and safe drinking water.

4. The emergency water filtration kiosk of claim 3, wherein the clean and safe drinking water is transferred via gravity from the water tank to the plurality of water access points and the external water output valve.

5. An emergency water filtration kiosk for providing clean and safe drinking water, comprising:
   an enclosed housing container, the enclosed housing container comprising:
   a) a plurality of water access points; and
   b) at least one door configured to provide access to interior components of the emergency water filtration kiosk;
   c) at least one interior compartment;
   a turn-key variable pump system housed inside the enclosed housing container;
   the turn-key variable pump system comprising a series of turn-key valves and at least three alternative power sources for pumping water;
   the at least three alternative power sources for pumping water comprising:
   a) a manual pump;
   b) a petrol pump; and
   c) an electric pump;
   a four-stage water filtration system housed inside the enclosed housing container;
   a water tank housed inside the enclosed housing container, the water tank connected to the plurality of water access points;

a water supply hose housed inside the enclosed housing container, the water supply hose removable from the enclosed housing container and configured to supply dirty water to the emergency water filtration kiosk;

the series of turn-key valves configured to select and direct dirty water received from the water supply hose to either the manual pump, the petrol pump, or the electric pump depending on power conditions currently available to the emergency water filtration kiosk;

the turn-key variable pump system configured to receive dirty water from the water supply hose and pump the dirty water through the four-stage water filtration system;

the four-stage water filtration system configured to purify the dirty water to provide clean and safe drinking water;

the water tank configured to store the clean and safe drinking water; and the plurality of water access points configured to dispense the clean and safe drinking water from the water tank to persons in need of the clean and safe drinking water.

6. The emergency water filtration kiosk of claim 5, wherein the manual pump is stored inside the enclosed housing container and removable during operation.

7. The emergency water filtration kiosk of claim 5, the four-stage water filtration system comprising:
a) a screen filter;
b) an ultrafiltration filter;
c) an activated carbon filter; and
d) a chlorine dosing unit comprising a refillable chlorine solution tank.

8. The emergency water filtration kiosk of claim 7, the ultrafiltration filter comprising:
a) a semi-permeable membrane configured to remove colloidal particles from water;
b) a chlorine cleaning input funnel configured to permit chemical solution to be injected into the ultrafiltration filter for cleaning purposes; and
c) an air pump configured for cleaning the ultrafiltration filter.

9. The emergency water filtration kiosk of claim 8, further comprising:
an external water output valve connected to the four-stage water filtration system and/or the water tank; and
the external water output valve configured to quickly supply large quantities of clean and safe drinking water directly from the four-stage water filtration system and/or the water tank to persons in need of the clean and safe drinking water.

10. The emergency water filtration kiosk of claim 9, wherein the clean and safe drinking water is transferred via gravity from the water tank to the plurality of water access points and the external water output valve.

11. The emergency water filtration kiosk of claim 5, the enclosed housing container comprising at least two forklift access ports located on opposite sides of the enclosed housing container.

12. The emergency water filtration kiosk of claim 5, the enclosed housing container comprising a series of detachable wheels located towards a bottom of the enclosed housing container.

13. The emergency water filtration kiosk of claim 5, the enclosed housing container comprising at least one hygiene education panel located on at least one side of the enclosed housing container.

14. The emergency water filtration kiosk of claim 5, wherein the emergency water filtration kiosk is capable of supplying 1,500 liters of clean and safe drinking water every hour and the daily drinking water requirements of 10,000 people daily.

15. A method of delivering clean and safe drinking water, comprising:
providing a source of dirty water;
providing the emergency water filtration kiosk of claim 1;
placing a first end of the water supply hose into the source of dirty water;
connecting a second end of the water supply hose to a water source inlet of the emergency water filtration kiosk;
selecting a specific turn-key valve to direct the dirty water to the corresponding manual pump, petrol pump, or electric pump of the turn-key variable pump system;
activating the corresponding manual pump, petrol pump, or electric pump of the turn-key variable pump system;
pumping the dirty water through the four-stage water filtration system via the activated turn-key variable pump system;
purifying the dirty water using the four-stage water filtration system;
storing clean and safe drinking water in the water tank; and
dispensing the clean and safe drinking water at the plurality of water access points to persons in need of the clean and safe drinking water.

16. The method of claim 15, further comprising manually cleaning the ultrafiltration filter using the air pump.

17. The method of claim 15, further comprising:
providing a chlorine cleaning input funnel with the ultrafiltration filter configured to allow for chemical cleaning of the ultrafiltration filter; and
chemically cleaning the ultrafiltration filter using the chlorine cleaning input funnel.

18. The method of claim 15, wherein the emergency water filtration kiosk is capable of supplying 1,500 liters of clean and safe drinking water every hour and the daily drinking water requirements of 10,000 people daily.

* * * * *